United States Patent [19]

Hayashino et al.

[11] Patent Number: 5,682,376
[45] Date of Patent: Oct. 28, 1997

[54] METHOD OF TRANSMITTING ORTHOGONAL FREQUENCY DIVISION MULTIPLEX SIGNAL, AND TRANSMITTER AND RECEIVER EMPLOYED THEREFOR

[75] Inventors: Hiroshi Hayashino, Takarazuka; Yasuo Harada, Kobe; Tomohiro Kimura, Kawachinagano; Yasuhiro Uno, Katano; Hiroshi Oue, Neyagawa, all of Japan

[73] Assignee: Matsushita Electric Industrial Co., Ltd., Osaka, Japan

[21] Appl. No.: 572,719

[22] Filed: Dec. 14, 1995

[30] Foreign Application Priority Data

Dec. 20, 1994 [JP] Japan .................. 6-316900
Mar. 20, 1995 [JP] Japan .................. 7-060732

[51] Int. Cl.$^6$ ............... H04J 11/00; H04L 27/28
[52] U.S. Cl. ............ 370/206; 370/210; 370/484; 375/260
[58] Field of Search ............... 370/201, 203, 370/204, 206, 208, 210, 343, 480, 482, 484; 375/260, 267, 285, 346, 347, 348

[56] References Cited

U.S. PATENT DOCUMENTS

| | | | |
|---|---|---|---|
| 5,345,440 | 9/1994 | Gledhill et al. | 370/203 |
| 5,371,548 | 12/1994 | Williams | 348/478 |
| 5,371,761 | 12/1994 | Daffara et al. | 370/210 |
| 5,406,551 | 4/1995 | Saito et al. | 370/203 |
| 5,416,767 | 5/1995 | Koppelaar et al. | 370/210 |
| 5,416,801 | 5/1995 | Chouly et al. | 370/207 |
| 5,504,775 | 4/1996 | Chouly et al. | 370/210 |
| 5,548,582 | 8/1996 | Brajal et al. | 370/210 |

FOREIGN PATENT DOCUMENTS 5-219021  8/1993  Japan.

OTHER PUBLICATIONS

"Suitable for Mobile Receiving of OFDM Broadcasting Employing at Least Hundreds of Carriers", Hajime Fukuchi, Communications Research laboratory, The Ministry of Posts and Telecommunications of Japan, Data Compression and Digital Modulation, Nikkei Electronics Books, Oct. 1, 1993, pp. 207–222.

*Primary Examiner*—Alpus H. Hsu
*Attorney, Agent, or Firm*—Wenderoth, Lind & Ponack

[57] ABSTRACT

A complex multiplier complex-multiplies a carrier modulation signal group for decoding the phases and amplitudes of a plurality of carriers which are orthogonal to each other on the frequency axis by a complex signal group having a predetermined specific pattern which varies in phase at random. An inverse Fourier transformer performs inverse Fourier transformation on an output of the complex multiplier, for transforming a digital signal which is multiplexed on the frequency axis to an OFDM signal on the time axis. A guard interval insertion part adds front and rear guard intervals to front and rear parts of each symbol of the OFDM signal respectively. The front and rear guard intervals include data which are identical to those of rear and front end parts of the corresponding symbol respectively. Arithmetic processing which is reverse to that on a transmission side is performed on a receiving side, whereby distortion of received data is removed. Thus, the OFDM signal can be transmitted with no waveform distortion on a data component of each symbol on the frequency axis after Fourier transformation even if a reflected wave is superposed on a direct wave due to a multipath.

12 Claims, 15 Drawing Sheets

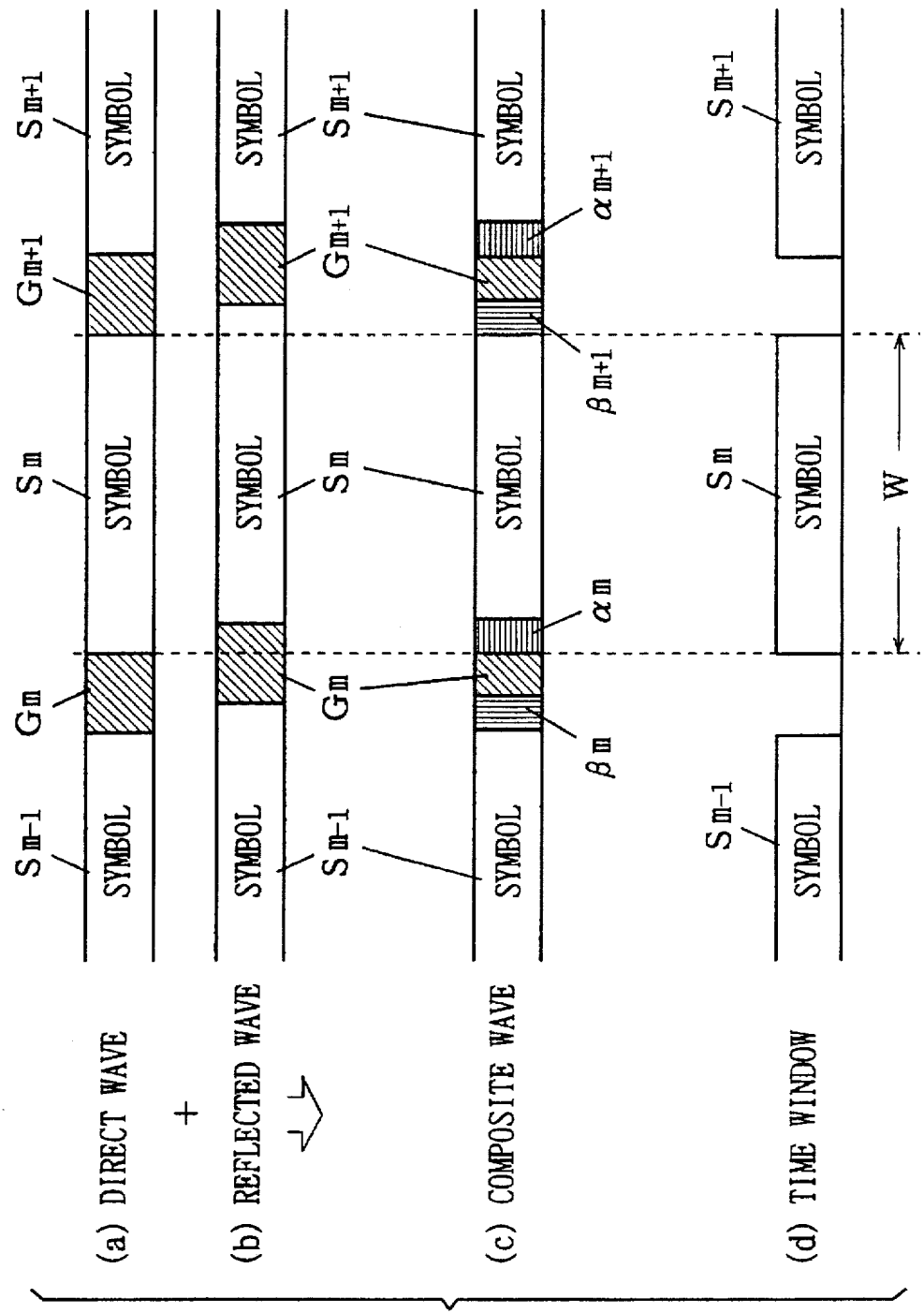

ered to as OFDM)

METHOD OF TRANSMITTING ORTHOGONAL FREQUENCY DIVISION MULTIPLEX SIGNAL, AND TRANSMITTER AND RECEIVER EMPLOYED THEREFOR

BACKGROUND OF THE INVENTION

1. Field of the Invention

The present invention relates to an orthogonal frequency division multiplexing (hereinafter referred to as OFDM) transmission method, and more specifically, it relates to a method of transmitting data between a transmission side and a receiving side through a wire or wireless transmission path with an orthogonal frequency division multiplex signal including symbols of prescribed lengths and guard intervals of prescribed lengths which are arranged between the symbols.

2. Description of the Background Art

As well known in the art, an OFDM transmission system is adapted to divide coded data and sort the same into at least hundreds of carriers, for multiplexing and transmitting the data. In relation to digital sound broadcasting for movable terminals or terrestrial digital television broadcasting, communication through an OFDM signal is recently watched with interest. The OFDM signal can transmit a large quantity of data at a high speed while its characteristics are hardly deteriorated by reflected waves even if no waveform equalizer is provided. Further, this signal hardly causes a crossfire to another service since its signal waveform is close to that of a random noise.

A transmission system employing such an OFDM signal is disclosed in "Suitable for Mobile Receiving of OFDM Digital Broadcasting Employing at least Hundreds of Carriers" by Hajime Fukuchi of the Communications Research Laboratory, the Ministry of Posts and Telecommunications of Japan, "Data Compression and Digital Modulation", Nikkei Electronics Books, issued on Oct. 1, 1993, pp. 207 to 222.

FIG. 13 is a block circuit diagram showing the structure of a conventional transmitter 5 for an OFDM signal which is disclosed in the aforementioned literature, and FIG. 14 illustrates the structure of an OFDM signal which is transmitted from the transmitter 5 shown in FIG. 13. Referring to FIG. 13, the transmitter 5 comprises a serial-to-parallel converter 52, an inverse Fourier transformer 53, a parallel-to-serial converter 54, a digital-to-analog converter 55, and a low-pass filter 56. Referring to FIG. 14, $(a)$, $(b)$ and $(c)$ show direct, reflected and composite waves of the OFDM signal respectively, and $(d)$ shows a time window W.

The serial-to-parallel converter 52 of the transmitter 5 is supplied with an input symbol train. The input symbol train is formed by digitally modulated transmission data, and each transmission symbol includes a plurality of data values. The digital modulation is performed by QPSK (quadriphase phase shift keying) modulation or 16 QAM (quadrature amplitude modulation). The serial-to-parallel converter 52 serial-to-parallel converts the input symbol train in every symbol, to obtain a plurality of symbol trains of a lower speed. The degree of parallelism is identical to the number (such as 512, for example, in the range of tens to thousands) of a plurality of carriers, which are orthogonal in phase to each other, employed in the inverse Fourier transformer 53. Due to this operation, the serial-to-parallel converter 52 outputs a group of carrier modulation signals for deciding the amplitudes and phases of the plurality of carriers which are employed in the inverse Fourier transformer 53.

The inverse Fourier transformer 53 allots the carrier modulation signals to the respective carriers which are lined up on the frequency axis in every symbol so that data for one symbol is transformed to a multiplex signal on the frequency axis, and collectively performs inverse Fourier transformation on the signals, thereby transforming the same to a multiplex signal (parallel digital signal in this stage) on the time axis.

The parallel-to-serial converter 54 parallel-to-serial converts the multiplex signal on the time axis, thereby forming a OFDM signal. The digital-to-analog converter 55 converts the OFDM signal to an analog OFDM baseband signal. The low-pass filter 56 limits the band of the OFDM baseband signal, so that no channel-to-channel interference is caused by aliasing.

Following the aforementioned series of operations, the transmitter 5 outputs the OFDM signal including guard intervals Gm and symbols Sm to the transmission path, as shown in FIG. 14. A demodulator (not shown) carries out signal processing which is reverse to that of the modulator 5 on the OFDM signal received through the transmission path, to reproduce an output symbol train which is identical to the input symbol train.

The so-called multipath is caused on the transmission path. Therefore, the receiver receives direct waves of the OFDM signal transmitted from the transmitter and reflected waves which are time-delayed from the direct waves in superposition. If a reflected wave (see $(b)$ in FIG. 14) by the multipath is superposed on a direct wave (see $(a)$ in FIG. 14) in the symbol Sm, for example, an interference part $\alpha m$ with the guard interval Gm of the reflected wave is caused on a front end part of the symbol Sm of a composite wave (see $(c)$ in FIG. 14), while an interference part $\beta m$ with a symbol Sm−1 of the reflected wave is caused on a front end part of the guard interval Gm. At this time, the interference part $\beta m$ which is displaced from the time window W exerts no influence on Fourier transformation of the symbol Sm. However, the interference part $\alpha m$ is caused in the time window W while the data component of the guard interval Gm is "0", and hence waveform distortion is disadvantageously caused on the data component of each symbol Sm on the frequency axis after the Fourier transformation.

On the other hand, a time delay is caused in the OFDM signal before the same reaches the receiver from the transmitter, due to delay characteristics of the transmission path, deviation in sampling timing resulting from mismatching between clocks of the digital-to-analog converter on the transmission side and an analog-to-digital converter on the receiving side, and the like. In the receiver, therefore, the time window W must disadvantageously be adjusted on the time axis.

The carrier modulation signals which are outputted from the serial-to-parallel converter 52 may not be out of phase with each other, but may be completely in phase with each other. For example, the carrier modulation signals are completely in phase with each other when a silent state is transmitted in excess of one symbol period in digital sound broadcasting or when a monochromatic picture is transmitted in excess of one symbol period in terrestrial digital television broadcasting. Also in the case of transmitting a sounding state or a multicolor picture, the carrier modulation signals tend to be completely in phase with each other in a digital modulation system such as the QPSK modulation or the 16 QAM, due to a limited number of signal points which are out of phase with each other.

When the carrier modulation signals are completely in phase with each other as described above and these signals are subjected to inverse Fourier transformation, nodes of the respective carriers match with each other on the time axis and addition/increase parts are concentrated to one portion on the time axis, and hence the OFDM signal has an impulsive signal waveform on the time axis, to cause power concentration. FIGS. 15(a) to 15(d) show this situation.

Referring to FIG. 15(a), a group of n carrier modulation signals for modulating n carriers which are orthogonal to each other respectively are completely in phase with each other on a complex plane. Referring to FIG. 15(b), the n carriers which are modulated by the n carrier modulation signals shown in FIG. 15(a) are multiplexed on the time axis. When the carrier modulation signals are thus completely in phase with each other, the OFDM signal becomes an impulsive waveform signal. Referring to FIG. 15(c), on the other hand, a group of n carrier modulation signals for modulating n carriers which are orthogonal to each other respectively are at random in phase on a complex plane. Referring to FIG. 15(d), the n carriers which are modulated by the n carrier modulation signals shown in FIG. 15(c) are multiplexed on the time axis. When the carrier modulation signals are thus completely out of phase from each other, the OFDM signal is evenly diffused on the time axis, and becomes a random waveform signal.

As hereinabove described, the OFDM signal has an impulsive waveform to extremely increase the maximum power when the carrier modulation signals are completely in phase with each other, and hence the OFDM signal is disadvantageously readily influenced by nonlinearity of the transmitter, the receiver, a relay amplifier such as a satellite or a CATV included in the transmission path and the like. In this case, the dynamic ranges of the transmitter, the receiver, the relay amplifier and the like may be increased to exert no influences of nonlinearity on the impulsive OFDM signal, while the cost for the transmitter, the receiver, the relay amplifier and the like is disadvantageously increased in this case.

SUMMARY OF THE INVENTION

Accordingly, an object of the present invention is to provide a method of transmitting an OFDM signal which causes no waveform distortion in a data component of each symbol on the frequency axis after Fourier transformation even if a reflected wave is superposed on a direct wave through a multipath, and a transmitter and a receiver therefor.

Another object of the present invention is to provide a method of transmitting an OFDM signal which can readily adjust a time window on the time axis even if a time delay is caused in the OFDM signal before the same reaches a receiving side from a transmission side, and a transmitter and a receiver therefor.

Still another object of the present invention is to provide a method of transmitting an OFDM signal which can reduce an influence of nonlinearity on the OFDM signal in a low-priced structure, and a transmitter and a receiver therefor.

A first aspect of the present invention is directed to a method of transmitting an orthogonal frequency division multiplex signal in every symbol of a prescribed length from a transmission side to a receiving side through a wire or wireless transmission path, and the method comprises:

a first step of transforming a carrier modulation signal group deciding the phases and amplitudes of a plurality of carriers which are orthogonal to each other on the frequency axis to the orthogonal frequency division multiplex signal on the time axis by performing inverse Fourier transformation in every symbol; and a second step of adding front and rear guard intervals, including data which are identical to those of rear and front end parts of each symbol of the orthogonal frequency division multiplex signal, to front and rear parts of the symbol respectively and transmitting the same to the receiving side.

According to the first aspect of the present invention, as hereinabove described, the front and rear guard intervals including the data which are identical to those of parts of each symbol are added to the front and rear parts of the symbol in transmission of each symbol of the OFDM signal, whereby all data components in a single symbol interval which are lined up on the time axis can be reproduced on the receiving side even if a time window in the Fourier transformation is slightly displaced from the symbol interval of the received signal. Therefore, it is not necessary to correctly coincide the time window with the symbol interval even if a time delay is caused in the OFDM signal before the same reaches the receiving side from the transmission side, whereby the time window can be readily adjusted on the time axis. Even if a symbol interval of a direct wave is superposed with a guard interval of a reflected wave due to a multipath, further, amplitude/phase distortion of each data component appearing on the frequency axis after the Fourier transformation on the receiving side is homogeneous in every symbol. Therefore, such waveform distortion can be readily removed from data components on the frequency axis of one symbol interval on the receiving side by simple arithmetic processing such as multiplication or addition.

In a preferred embodiment of the aforementioned first aspect, the carrier modulation signal group is complex-multiplied by a reference complex signal group on the frequency axis, so that the complex multiplication result is transformed to an OFDM signal and transmitted to the receiving side. On the receiving side, on the other hand, the OFDM signal which is transmitted from the transmission side is transformed to a receiving carrier modulation signal group so that this receiving carrier modulation signal group is complex-divided by the reference complex signal group on the frequency axis. Even if a time delay is caused in the OFDM signal between the transmission side and the receiving side, therefore, modulated data can be obtained on the receiving side with no influence by the time delay.

As to the reference complex signal group for complex-multiplying the carrier modulation signal group, a result of complex multiplication which is carried out in advance of a constant symbol may be employed with respect to each symbol of the carrier modulation signal group.

Alternatively, the reference complex signal group may be prepared from a complex signal group having a predetermined specific pattern with signals which vary in phase at random. In this case, a complex multiplication result which is obtained in a third step is ordinarily transformed to an OFDM signal, while the reference complex signal group is periodically transformed to an OFDM signal. Thus, the absolute reference phases of the respective signals of the carrier modulation signal group are random values, whereby the OFDM signal obtained by the inverse Fourier transformation can be suppressed from time concentration of power. Thus, it is not necessary to increase the dynamic ranges of the transmitter, the receiver and the transmission path but influences exerted by nonlinearity of the transmitter, the receiver and a relay amplifier on the OFDM signal can be reduced through a low-priced structure.

A second aspect of the present invention is directed to a transmitter for an orthogonal frequency division multiplex signal, which is an apparatus for transmitting the orthogonal frequency division multiplex signal to a receiving side in every symbol of a prescribed length through a wire or wireless transmission path, and the transmitter comprises:

a memory part storing a reference complex signal group;

a complex multiplication part, complex-multiplying a carrier modulation signal group deciding the phases and amplitudes of a plurality of carriers which are orthogonal to each other on the frequency axis, by the reference complex signal group stored in the memory part on the frequency axis, for outputting a transmission carrier modulation signal group;

an inverse Fourier transformation part performing an inverse Fourier operation on the transmission carrier modulation signal group which is outputted from the complex multiplication part in every symbol thereby transforming the transmission carrier modulation signal group to the orthogonal frequency division multiplex signal on the time axis;

a guard interval addition part adding front and rear guard intervals, including data which are identical to those of rear and front end parts of each symbol of the orthogonal frequency division multiplex signal outputted from the inverse Fourier transformation part, to front and rear parts of the symbol respectively; and a transmission part transmitting the orthogonal frequency division multiplex signal having the added front and rear guard intervals to the receiving side in every symbol.

In a preferred embodiment of the aforementioned second aspect, the memory part stores a complex multiplication result of the complex multiplication part which is precedent to a constant symbol as the reference complex signal group.

In another preferred embodiment of the aforementioned second aspect, the memory part stores a predetermined complex signal group as the reference complex signal group. On the other hand, the complex multiplication part complex-multiplies the carrier modulation signal group by the reference complex signal group which is stored in the memory part on the frequency axis and outputs the result. Further, the inverse Fourier transformation part ordinarily transforms the complex multiplication result which is outputted from the complex multiplication part to an orthogonal frequency division multiplex signal in every symbol, and periodically transforms the reference complex signal group which is outputted from the memory part to an orthogonal frequency division multiplex signal.

According to the aforementioned second aspect, the memory part may hold an output of a pseudo-noise signal generation part generating a pseudo-noise signal or that of a frequency sweep signal generation part generating a frequency sweep signal as the reference complex signal group.

A third aspect of the present invention is directed to a receiver for an orthogonal frequency division multiplex signal, which is an apparatus for receiving the orthogonal frequency division multiplex signal transmitted from a transmission side in every symbol of a prescribed length through a wire or wireless transmission path, and the receiver comprises:

a Fourier transformation part performing a Fourier transformation operation on the orthogonal frequency division multiplex signal on the time axis in every symbol thereby transforming the orthogonal frequency division multiplex signal to a receiving carrier modulation signal group on the frequency axis;

a memory part storing the receiving carrier modulation signal group which is outputted from the Fourier transformation part in every symbol as a receiving reference complex signal group; and a complex division part complex-dividing the receiving carrier modulation signal group which is outputted from the Fourier transformation part by the receiving reference complex signal group which is stored in the memory part on the frequency axis.

A fourth aspect of the present invention is directed to a method of transmitting an orthogonal frequency division multiplex signal from a transmission side to a receiving side in every symbol of a prescribed length through a wire or wireless transmission path, and the method comprises:

a first step of forming a carrier modulation signal group for deciding the phases and amplitudes of a plurality of carriers which are orthogonal to each other on the frequency axis in every symbol;

a second step of generating a complex signal group having a predetermined specific pattern with signals varying in phase at random;

a third step of complex-multiplying the carrier modulation signal group by the complex signal group on the frequency axis in every symbol, thereby randomizing phases of respective signals of the carrier modulation signal group; and a fourth step of ordinarily transforming the carrier modulation signal group having the signals which are randomized in phase in the third step to an orthogonal frequency division multiplex signal on the time axis by inverse Fourier transformation in every symbol, and periodically transforming the complex signal group to an orthogonal frequency division multiplex signal by inverse Fourier transformation, for transmitting the same to the receiving side respectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 illustrates the structure of the OFDM signal which is transmitted from the transmitter 5 shown in FIG. 13.

DESCRIPTION OF THE PREFERRED EMBODIMENTS

With reference to the drawings, description is now made on embodiments of a method of transmitting an OFDM signal, and a transmitter and a receiver employed therefor according to the present invention.

Figure 1:
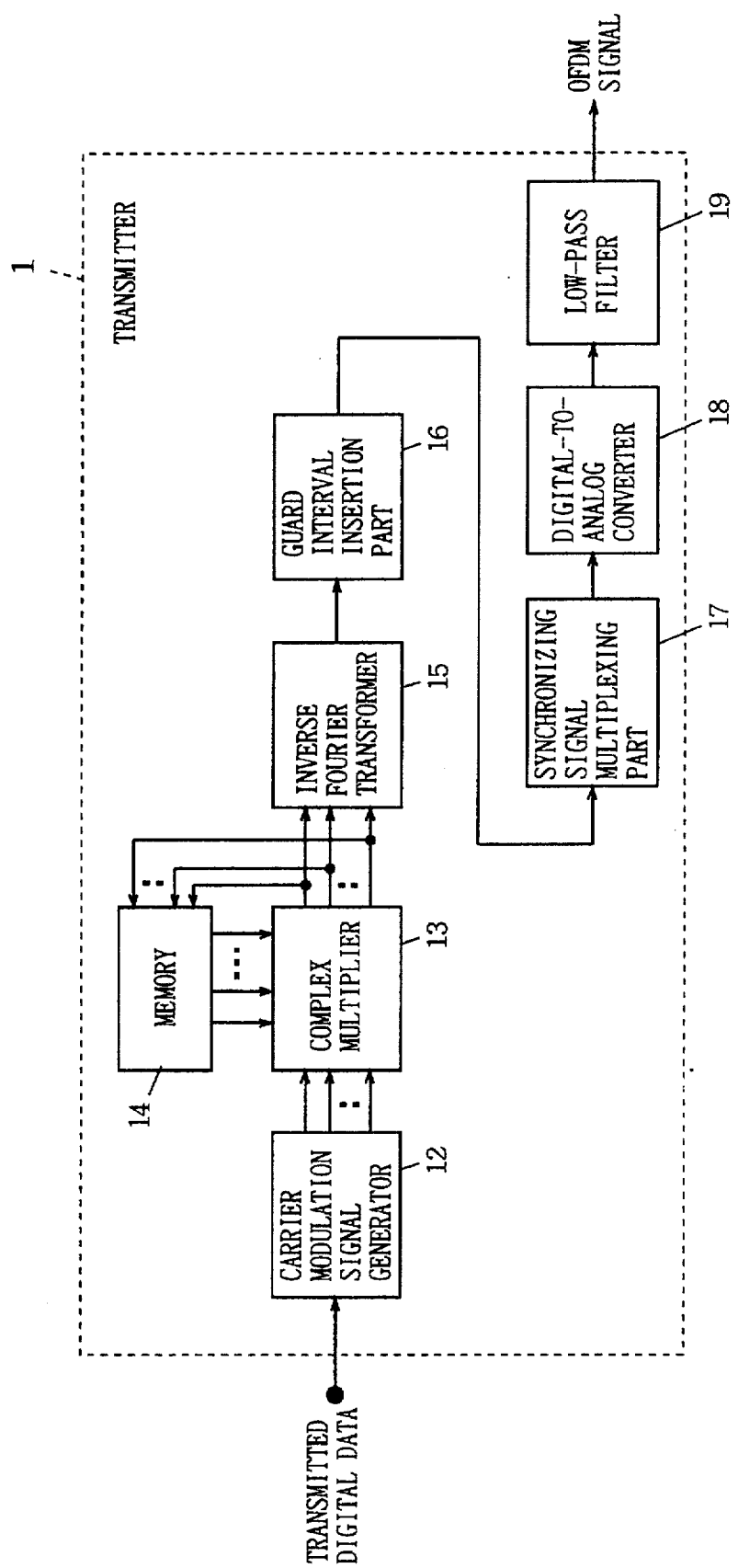
FIG. 1 is a block diagram showing the structure of a transmitter 1 according to a first embodiment of the present invention.
Figure 2:
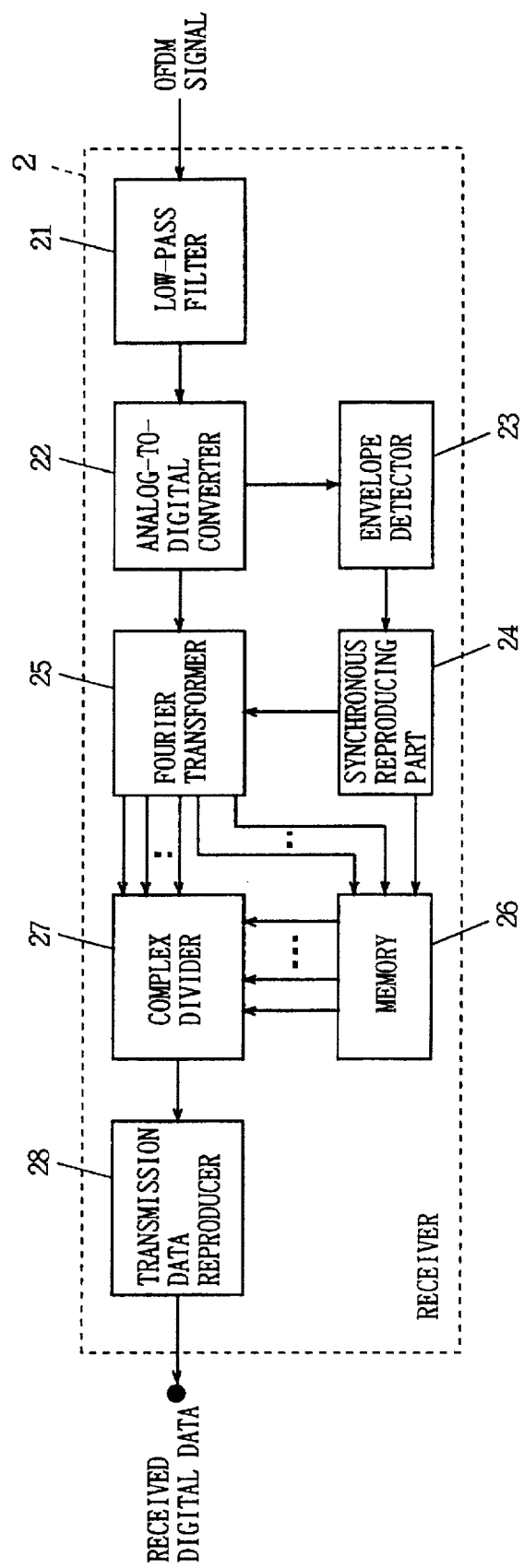
FIG. 2 is a block diagram showing the structure of a receiver 2 according to the first embodiment of the present invention.
Figure 3:
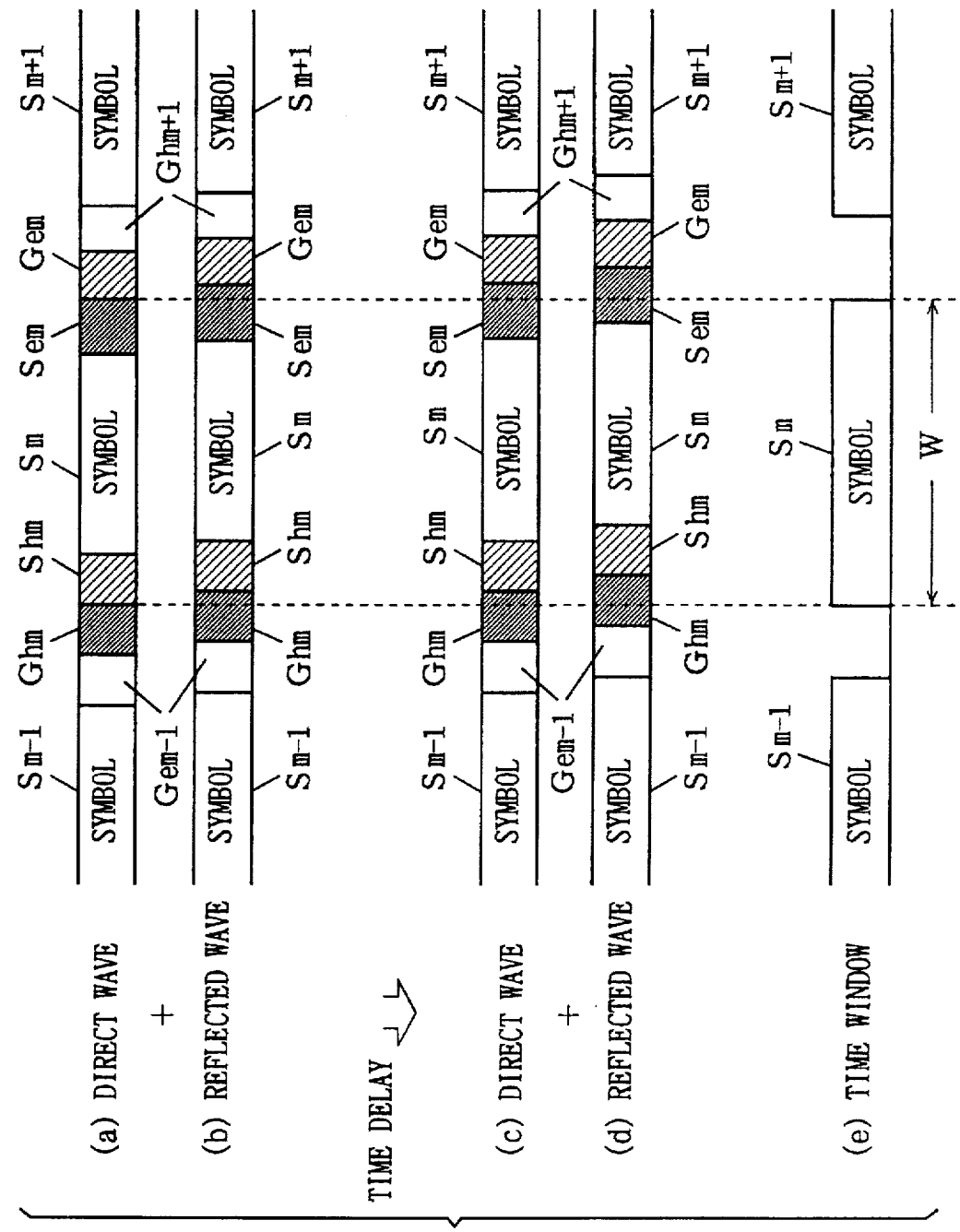
FIG. 3 illustrates the structure of an OFDM signal which is transmitted from the transmitter 1 shown in FIG. 1.

FIG. 1 is a block diagram showing a transmitter 1 according to a first embodiment of the present invention, FIG. 2 is a block diagram showing the structure of a receiver 2 according to the first embodiment of the present invention, and FIG. 3 illustrates an exemplary structure of an OFDM signal which is employed in the present invention. Referring to FIG. 3, (a) and (b) show direct and reflected waves of the OFDM signal respectively and (c) and (d) show direct and reflected waves of the OFDM signal causing time delays respectively, while (e) shows a time window W.

The transmitter 1 shown in FIG. 1 and the receiver 2 shown in FIG. 2 are connected with each other through a transmission path (not shown) such as a coaxial cable or an optical fiber cable. The transmitter 1 and the receiver 2 are employed in a digital CATV system, for example. The transmitter 1 is adapted to transmit picture data for multiple channels of a television, for example, to the receiver 2 through an OFDM signal.

Referring to FIG. 1, the transmitter 1 comprises a carrier modulation signal generator 12, a complex multiplier 13, a memory 14, an inverse Fourier transformer 15, a guard interval insertion part 16, a synchronizing signal multiplexing part 17, a digital-to-analog converter 18, and a low-pass filter 19.

Figure 13:
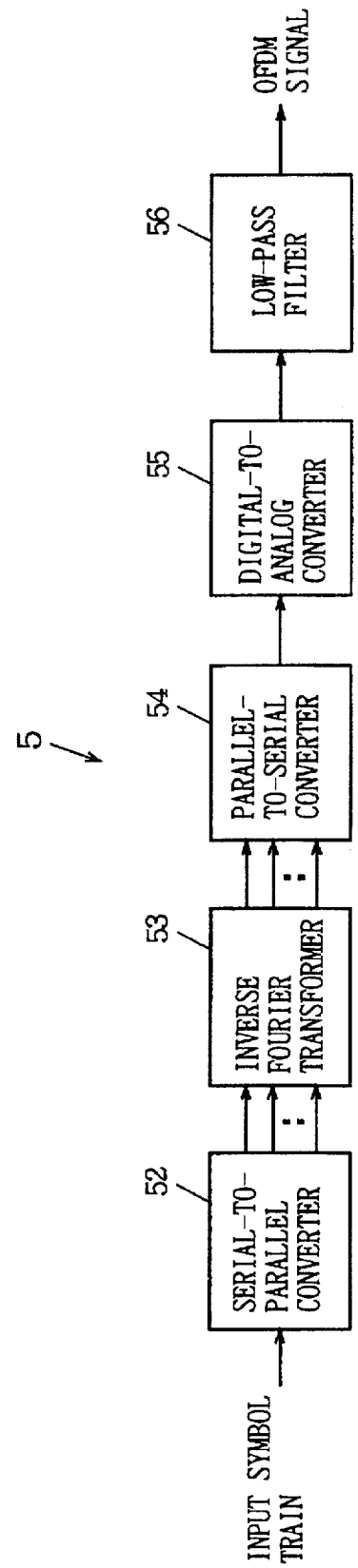
FIG. 13 is a block diagram showing the structure of a conventional transmitter for an OFDM signal.
Figure 15A:
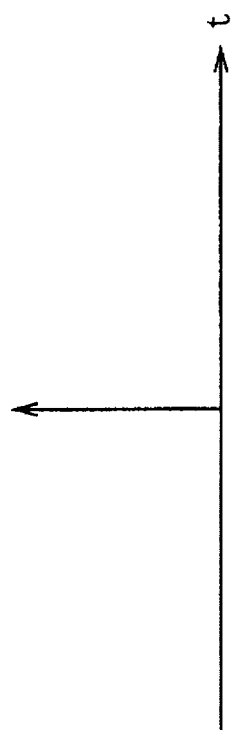
FIGS. 15(a) to 15(d) are signal waveform diagrams showing the relations between phase states of carrier modulation signal groups allotted to carriers which are orthogonal to each other and OFDM signals respectively.
Figure 15B:
Figure 15C:
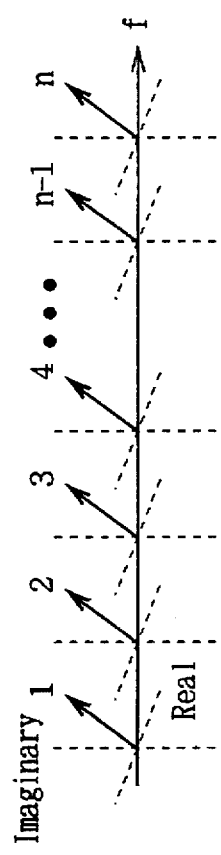
Figure 15D:
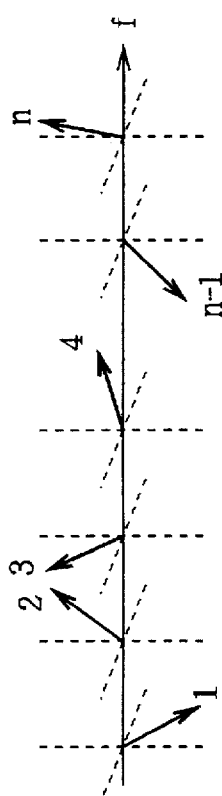

The carrier modulation signal generator 12 of the transmitter 1 receives transmitted digital data (bit stream signal) to be transmitted to the receiver 2. The carrier modulation signal generator 12 digital-modulates the inputted transmitted digital data and serial-to-parallel converts the same in every symbol interval, thereby converting the data to a carrier modulation signal group including n (512, for example, in the range of tens to thousands) carrier modulation signals for modulating n carriers which are orthogonal to each other. The digital modulation is performed by QPSK modulation or 16 QAM. The carrier modulation signal group in this stage is similar to that outputted from the serial-to-parallel converter 52 (see FIG. 13) of the conventional transmitter. The carrier modulation signal group which is outputted from the carrier modulation signal generator 12 is supplied to the complex multiplier 13. The memory 14 can store such a carrier modulation signal group D'm outputted from the complex multiplier 13 for one symbol. When a carrier modulation signal group Dm is inputted in the complex multiplier 13, the memory 14 outputs a carrier modulation signal group D'm−1, which is precedent to one symbol, stored therein to the complex multiplier 13 as a prescribed reference complex signal group. The complex multiplier 13 complex-multiplies the inputted transmission signal group Dm by the reference complex signal group D'm−1 which is precedent by one symbol on the frequency axis, thereby forming the following carrier modulation signal group:

$$D'm \ (D'm = Dm \times D'm-1)$$

Assuming that Dm[k]real represents the real number part of a k-th (k=1, 2, ..., n) carrier modulation signal of the carrier modulation signal group, including n carrier modulation signals, which is inputted in the complex multiplier 13 and Dm[k]imag represents the imaginary number part thereof while D'm−1[k]real represents the real number part of the k-th carrier modulation signal which is stored in the memory 14 and D'm−1 [k]imag represents the imaginary number part thereof, the complex multiplier 13 carries out multiplication processing as to the real and imaginary number parts of each carrier modulation signal, for outputting:

$$D'm[k]\text{real} = Dm[k]\text{real} \times D'm-1 \ [k]\text{real}$$

$$D'm[k]\text{imag} = Dm[k]\text{imag} \times D'm-1 \ [k]\text{imag}$$

Figure 4:
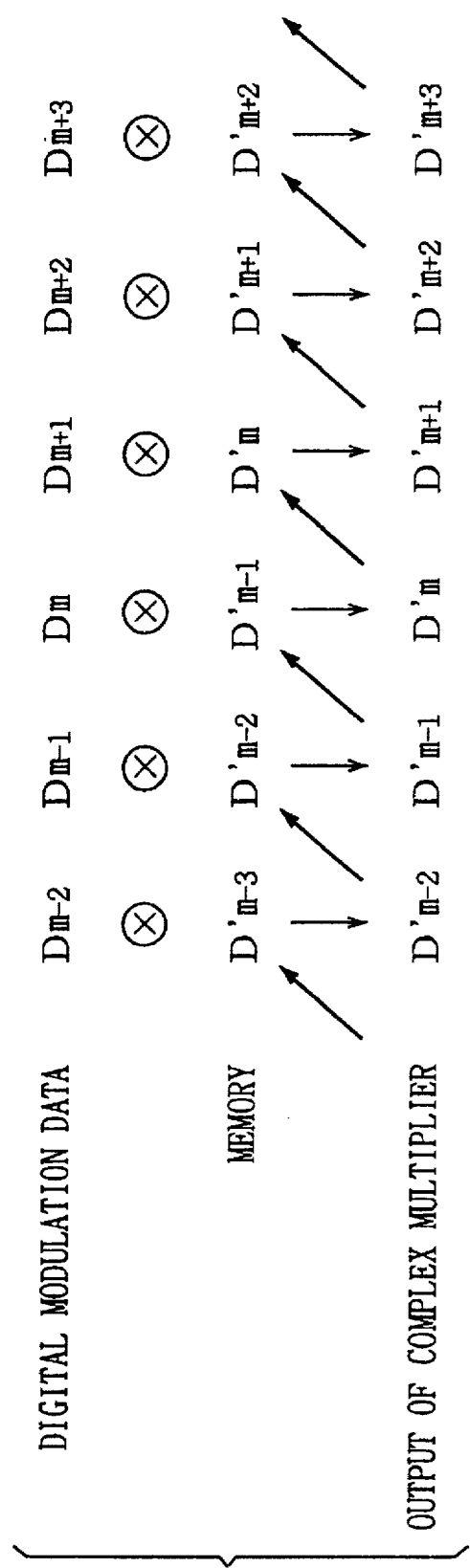
FIG. 4 illustrates operations of a memory 14 and a complex multiplier 13 shown in FIG. 1.

The memory 14 stores the carrier modulation signal D'm (including D'm[k]real and D'm[k]imag) of the real and imaginary numbers outputted from the complex multiplier 13. As shown in FIG. 4, the memory 14 and the complex multiplier 13 repeatedly execute the aforementioned operations.

The inverse Fourier transformer 15 successively allots the respective carrier modulation signals included in the carrier modulation signal group D'm which is outputted from the complex multiplier 13 to the respective carriers which are lined up on the frequency axis in every symbol interval, collectively performs inverse Fourier transformation thereon, and further performs parallel-to-serial conversion, thereby transforming the carrier modulation signal group multiplexed with the respective data components on the frequency axis to an OFDM signal D'mt multiplexed with the respective data components on the time axis.

The guard interval insertion part 16 temporarily stores the digital OFDM signal D'mt which is outputted from the inverse Fourier transformer 15 in its internal buffer in every symbol interval. Then, the guard interval insertion circuit 16 adds front and rear guard intervals Ghm and Gem to front and rear parts of each symbol Sm (see FIG. 3). Time lengths tg1 and tg2 of the front and rear guard intervals Ghm and Gem are prescribed in consideration of time difference between direct and indirect waves due to a multipath caused in the transmission path and time delays resulting from sampling deviation between the digital-to-analog converter 18 of the transmitter 1 and an analog-to-digital converter 22 of the receiver 2. Further, the front and rear guard intervals Ghm and Gem include data D'emt and D'hmt which are identical to those of rear and front end parts Sero and Shm of the corresponding symbol Sm respectively. Thus, the substantial symbol length is extended to tg1+ts+tg2. The guard interval insertion part 16 successively outputs the data D'emt, D'm and D'hmt through the front guard interval Ghm, the symbol Sm and the rear guard interval Gem.

The synchronizing signal multiplexing part 17 multiplexes a synchronizing signal on the OFDM signal to which the guard intervals are added on the time axis in every symbol in order to indicate the breakpoint of the symbol, and outputs the signal to the digital-to-analog converter 18. The synchronizing signal is formed by a periodically known nonmodulated carrier, a suppression signal etc. with respect to the OFDM signal, as shown at (a) in FIG. 5, for example.

The digital-to-analog converter 18 converts the OFDM signal of the digital data, to which the guard intervals and the synchronizing signal are added, outputted from the synchronizing signal multiplexing part 17 to an analog OFDM baseband signal. The low-pass filter 19 limits the band of the OFDM baseband signal, so that no channel-to-channel interference is caused by aliasing.

As the result of the aforementioned series of operations, the transmitter 1 outputs the OFDM signal including the guard intervals and the synchronizing signal to the transmission path.

Referring to FIG. 2, the receiver 2 comprises a low-pass filter 21, the analog-to-digital converter 22, an envelope detector 23, a synchronous reproducing part 24, a Fourier transformer 25, a memory 26, a complex divider 27, and a transmission data reproducer 28.

The low-pass filter 21 removes unnecessary spectral components of a high-frequency region from the OFDM signal which is received through the transmission path.

In consideration of a time delay Δt caused by the multipath or the delay characteristics of the transmission path, the OFDM signal which is received in the receiver 2 is represented by ZD'mt, where Z represents the signal delay as follows:

$$Z = \exp j2\pi f_c \Delta t$$

The analog-to-digital converter 22 converts data ZD'emt, ZD'mt and ZD'hmt which are included in the front guard interval Ghm, the symbol Sm and the rear guard interval Gem of the analog OFDM signal respectively to those of a digital OFDM signal.

Figure 5:
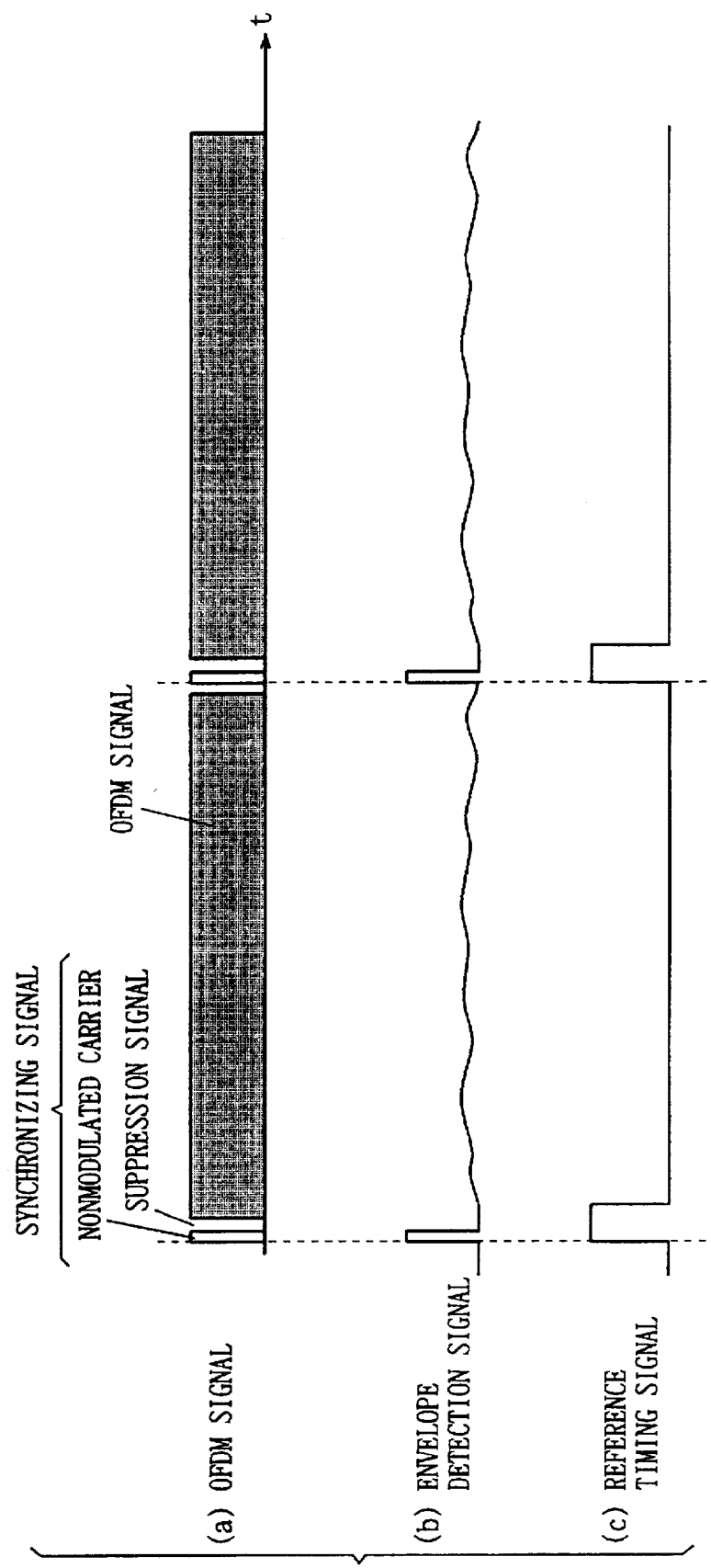
FIG. 5 illustrates operations of an envelope wave detector 23 and a synchronous reproducer 24 of the receiver 2 with respect to the OFDM signal which is outputted from the transmitter 1 shown in FIG. 1.

The envelope detector 23 envelope-detects the OFDM signal, thereby outputting an envelope detection signal shown at (b) in FIG. 5 in every symbol. The synchronous reproducing part 24 outputs a reference timing signal shown at (c) in FIG. 5 in every symbol on the basis of the envelope detection signal outputted from the envelope detector 23. This reference timing signal is inputted in the Fourier transformer 25 and the memory 26.

The Fourier transformer 25 observes the OFDM signal which is outputted from the analog-to-digital converter 22 in synchronization with the reference timing signal through the time window W (see (e) in FIG. 3) of the same length as the symbol length ts, thereby extracting only necessary data parts of the respective symbols. The Fourier transformer 25 further performs Fourier transformation operations on the extracted data parts, thereby transforming the OFDM signal on the time axis to a receiving carrier modulation signal group on the frequency axis.

The memory 26 stores the receiving carrier modulation signal group which is outputted from the Fourier transformer 25 for one symbol. When the transmitter 1 transmits data D'm, the memory 26 stores data ZD'm as corresponding data. The data ZD'm is obtained by adding a time delay Z caused by the multipath or the transmission path to the data D'm, as follows:

$$ZD'm = D'm \times \exp j2\pi f_c \Delta t$$

The memory 26 outputs the data ZD'm to the complex divider 27 in synchronization with the reference timing signal. The complex divider 27 establishes synchronization, and then complex-divides data ZD'm+1 of a symbol Sm+1 which is outputted from the Fourier transformer 25 by the data ZD'm held in the memory 26. Namely, the complex divider 27 performs the following operation:

$$ZD'm+1/ZD'm = D'm+1D'm = Dm+1$$

Figure 6:
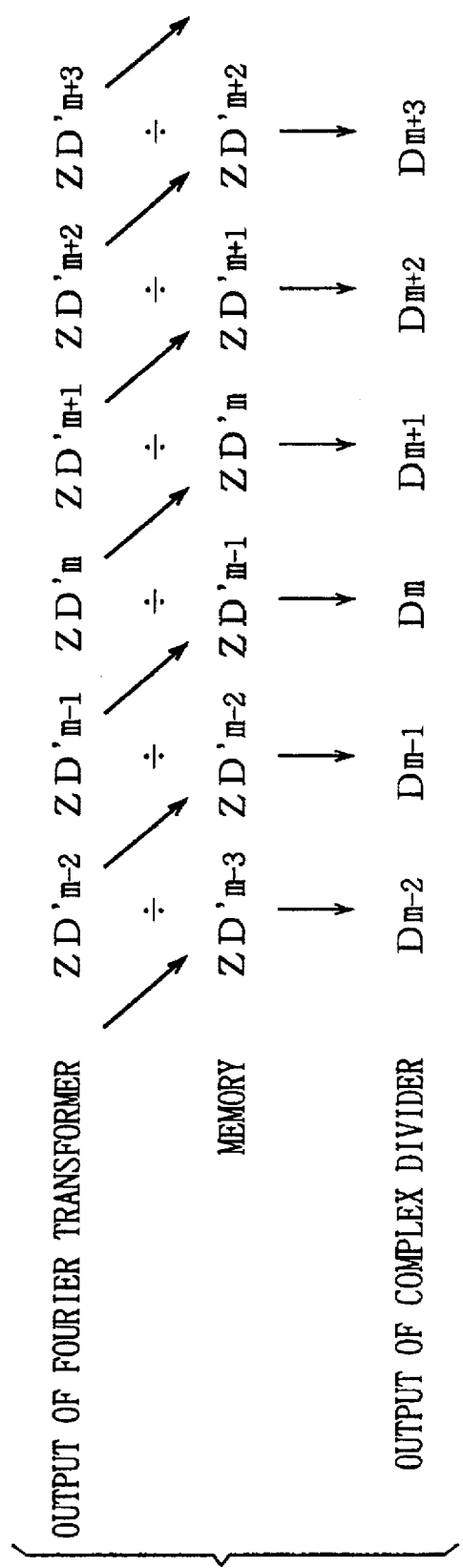
FIG. 6 illustrates operations of a memory 26 and a complex divider 27 shown in FIG. 2.
Figure 7A:
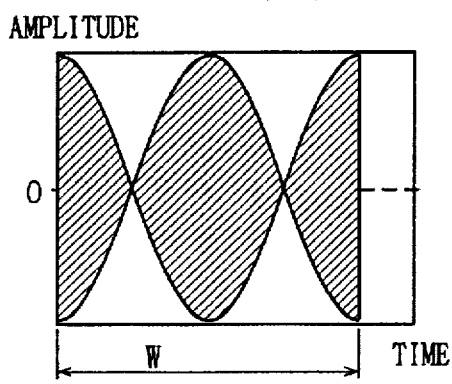
FIG. 7 illustrates comparative results of a simulation for comparing a conventional system and the system according to the first embodiment with each other in relation to influences exerted by delayed waves by multipaths.
Figure 7E:
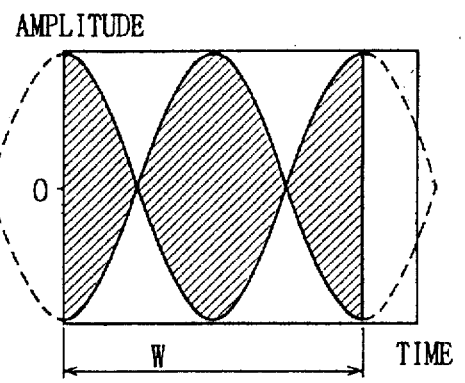
Figure 7B:
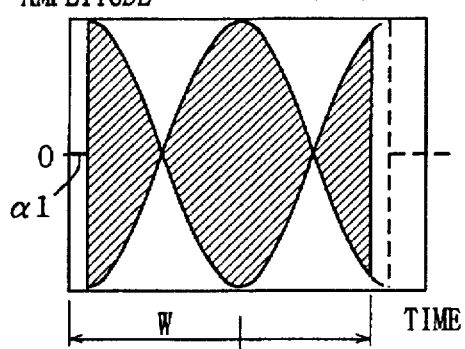
Figure 7F:
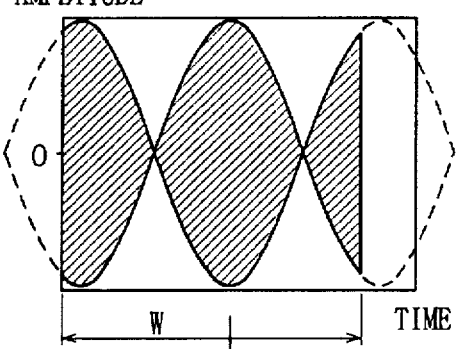
Figure 7C:
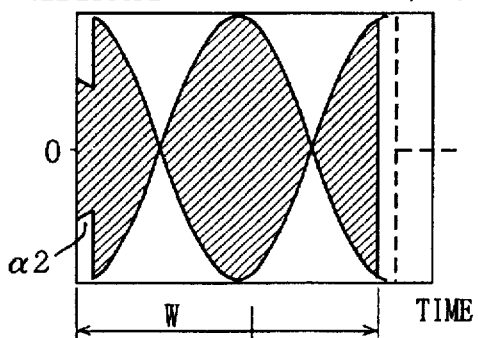
Figure 7G:
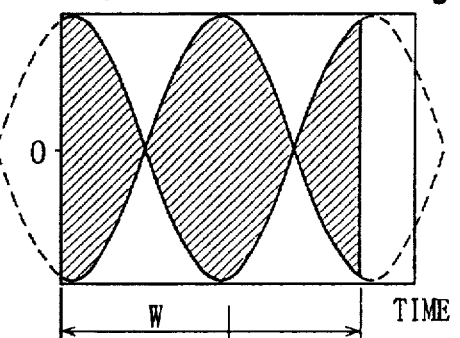
Figure 7D:
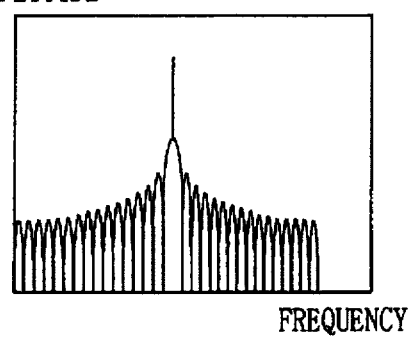
Figure 7H:
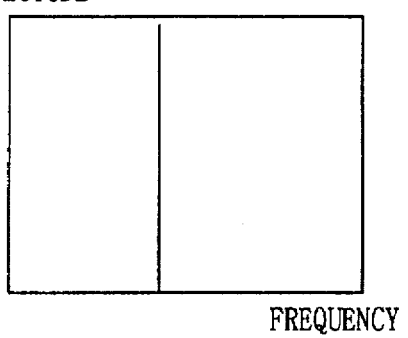
Figure 8A:
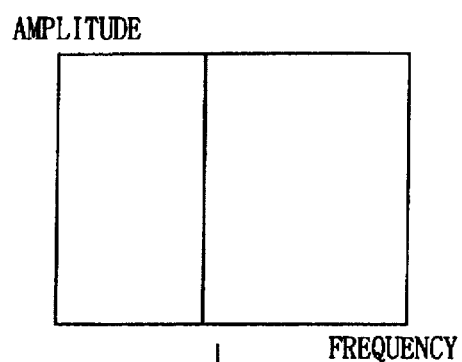
FIG. 8 illustrates results of a simulation for comparing the conventional system and the system according to the first embodiment with each other in relation to influences exerted by time delays through transmission paths etc.
Figure 8B:
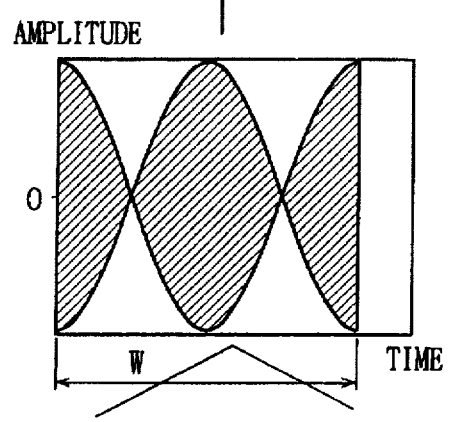
Figure 8C:
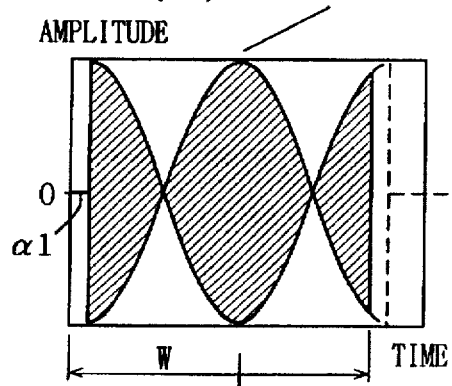
Figure 8E:
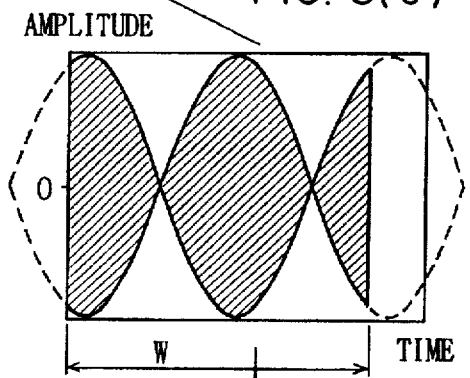
Figure 8D:
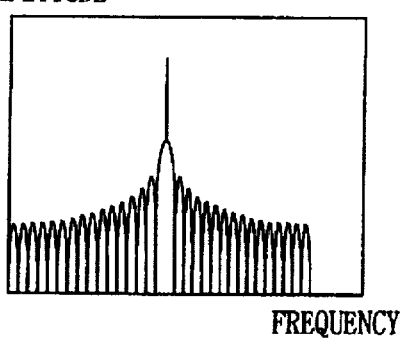
Figure 8F:
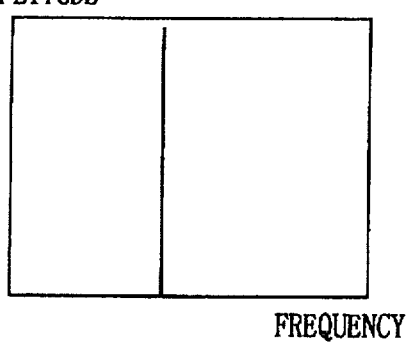

As shown in FIG. 6, the Fourier transformer 25, the memory 26 and the complex divider 27 repeatedly execute the aforementioned operations.

As hereinabove described, a relative time delay is caused between the direct and reflected waves shown at (a) and (b) in FIG. 3, due to the multipath. Further, specific time delays are caused in the direct and reflected waves, due to the difference in sampling timing between the digital-to-analog converter 18 of the transmitter 1 and the analog-to-digital converter 22 of the receiver 2 (see (c) and (d) in FIG. 3). These time delays are not taken into consideration in the Fourier transformer 25 as to the reference timing signal, and hence positions of the receiving side time window W on the time axis are displaced from the symbol intervals of the received signal, as shown at (e) in FIG. 3.

Even if the time window W is displaced from correct symbol intervals in the Fourier transformer 25 of the receiving side, however, the data observed through the time window W include all data ZD'mt on the time axis which must be originally included in one symbol interval since the front and rear guard intervals Ghm and Gem include the data ZD'emt and ZD'hmt respectively. Therefore, the time delays and superposition of the reflected waves appear as uniform amplitude/phase distortion in every data component on the frequency axis. When the time delays and the characteristics of the reflected waves are uniform, the values of the amplitude/phase distortion in the respective symbol intervals are equal to each other. According to this embodiment, the complex divider 27 complex-divides the data ZD'm+1 of the symbol Sm+1 which is outputted from the Fourier transformer 25 by the data ZD'm held in the memory 26, thereby canceling the data delay Z and obtaining the original carrier modulation signal group Dm+1 with no delay. Namely, the amplitude/phase distortion is canceled by the following operation of the complex divider 27:

$$ZD'm+1/ZD'm = D'm+1/D'm = Dm+1$$

Thus, data Dm having no phase/amplitude distortion can be obtained as to each symbol.

According to this embodiment, as hereinabove described, the guard intervals including the data which are identical to those of the front and rear end parts of each symbol are added to the front and rear parts of the symbol respectively for transmitting the data, whereby all data components in one symbol interval which are lined up on the time axis can be reproduced on the receiving side as to both of the direct and reflected waves in the time window W. Therefore, the respective data components appearing on the frequency axis after the Fourier transformation are uniform in amplitude/phase distortion even if the reflected waves are superposed on the direct waves by the multipath to result in superposition of the symbol intervals of the direct waves and the guard intervals of the reflected waves. Therefore, waveform distortion can be readily removed from the receiving carrier modulation signal group on the frequency axis of one symbol interval by executing proper operations (multiplication and division) on the transmission and receiving sides.

According to this embodiment, further, demodulated data can be obtained with no time delay even if a time delay is caused in the OFDM signal between the transmission and receiving sides, by complex-multiplying and complex-dividing the receiving carrier modulation signal group by the prescribed reference complex signal group on the frequency axis. Consequently, it is not necessary to correctly coincide the time window with the symbol interval.

The transmission data reproducer 28 demaps signal points of the receiving carrier modulation signal group Dm which is outputted from the complex divider 27 on a complex plane and decides the signal points, thereby obtaining a receiving digital signal group which is identical in value to the transmission digital signal group of the transmitter 1. As hereinabove described, phase distortion and amplitude distortion are removed from the receiving carrier modulation signal group Dm. Therefore, the transmission data reproducer 28 can correctly and readily determine the original data from the mapping positions on the complex plane.

The inventors have made simulations of comparing the system according to this embodiment with the conventional system with respect to influences exerted by waves delayed by multipaths and those exerted by time axis delays respectively through a calculator. Each simulation was executed on such conditions that the carrier number was 512, only data of a 256-th carrier had an amplitude "1" and a phase "0", and all data of the remaining carriers were "0".

FIG. 7 illustrates the results of the simulation for comparing the system according to this embodiment with the conventional system as to the influences exerted by waves delayed by multipaths. Referring to FIG. 7, (a), (b), (c) and (d) show data distortion states in the case of transforming direct, indirect, composite and composite waves in the conventional system to signals on the frequency axis by Fourier operations respectively. On the other hand, (e), (f), (g) and (h) show data distortion states in the case of converting direct, indirect, composite and composite waves in the system according to this embodiment to signals on the frequency axis by Fourier operations respectively.

In the conventional system, no data is inserted in any guard interval (see α1 at (b) in FIG. 7), and hence an interference part α2 appears in a time window W of the composite wave (see (c) in FIG. 7). When the composite wave is transformed to a signal on the frequency axis by a Fourier operation in the time window W, therefore, the spectrum of the data of the 256-th carrier is spread and the data of the remaining carriers, which must have originally been "0", are distorted. Thus, the transmission data reproducer 28 readily causes an erroneous determination. Further, the transmission data reproducer 28 also readily causes erroneous determinations as to other carriers. In the system according to this embodiment, on the other hand, data are inserted in the guard intervals and hence no influences are exerted on the data of the remaining carriers.

FIG. 8 illustrates the results of the simulation for comparing the system according to this embodiment with the conventional system as to the influences exerted by time delays caused by transmission paths etc. Referring to FIG. 8, (a) shows a spectrum obtained under such conditions that only the data of the 256-th carrier had an amplitude "1" and a phase "0", and (b) shows a signal waveform in the case of transforming the data at (a) to a signal on the time axis by an inverse Fourier operation. Referring to FIG. 8, further, (c) and (d) show data distortion states in the case of transforming composite and composite waves causing time delays in the conventional system to signals on the frequency axis by Fourier operations respectively. On the other hand, (e) and (f) show data distortion states in the case of transforming composite and composite waves causing time delays in the system according to this embodiment to signals on the frequency axis by Fourier operations respectively.

In the conventional system, no data is inserted in any guard interval (see α1 at (c) in FIG. 8), and hence an interference part α2 appears in a time window W of the composite wave, similarly to the case shown at (c) in FIG. 7. When the composite wave is transformed to a signal on the frequency axis by a Fourier operation in the time window W, therefore, the spectrum of the data of the 256-th carrier is spread and the data of the remaining carriers, which must have originally been "0", are distorted, as shown at (d) in FIG. 8. Thus, the transmission data reproducer 28 readily causes erroneous determinations also as to other carriers. In the system according to this embodiment, on the other hand, data are inserted in the guard intervals and hence no influences are exerted on the data of the remaining carriers.

Figure 9:
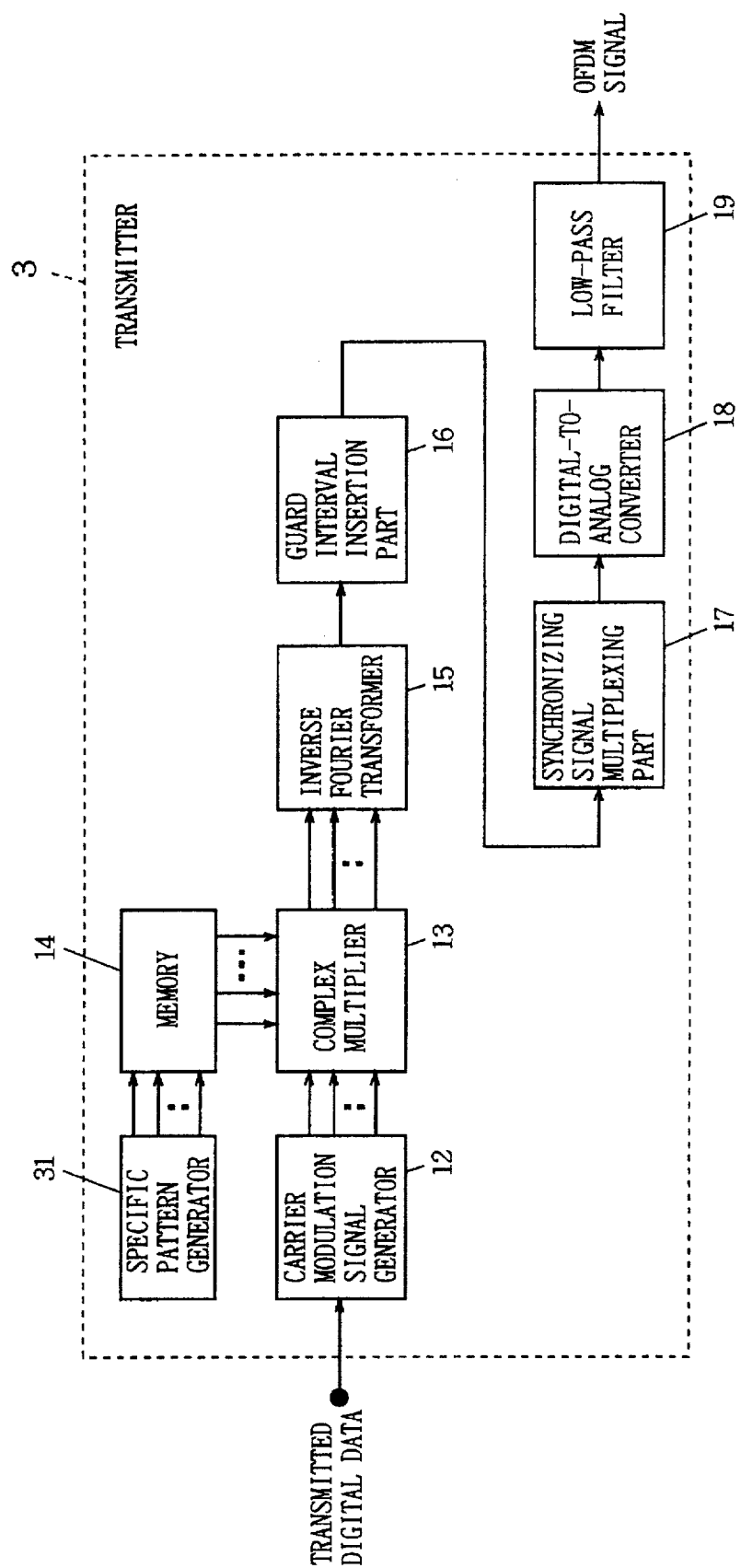
FIG. 9 is a block diagram showing the structure of a transmitter according to a second embodiment of the present invention.

FIG. 9 is a block diagram showing the structure of a transmitter 3 according to a second embodiment of the present invention. In the transmitter 3 shown in FIG. 9, portions corresponding to those of the transmitter 1 shown in FIG. 1 are denoted by the same reference numerals, to omit redundant description. As to the embodiment shown in FIG. 9, it is to be noted that a memory 14 holds an output of a specific pattern generator 31, i.e., a complex signal group D0 having a predetermined specific pattern with signals which mutually vary in phase at random. Such a complex signal group D0 can be formed by a pseudo-noise signal generator comprising a PN series pseudo-random signal generator for generating a pseudo-random signal which is at a level between zero and 1 and a multiplier for multiplying the pseudo-random signal by 2π for generating a unit vector signal in a phase having a random value in the range of zero to 2π and an amplitude of 1, for example. Alternatively, the complex signal group D0 can be formed by a frequency sweep signal generator for generating a known frequency sweep signal in a phase having a random value in the range of zero to 2π.

A complex multiplier 13 complex-multiplies data Dm of each symbol interval by data D0 on the frequency axis every time data Dm is inputted for forming data D'm (D'm=Dm× D0), thereby randomizing mutual phases of respective carrier modulation signals included in a carrier modulation signal group to specific patterns.

Figures 10A, 10B, 10C:
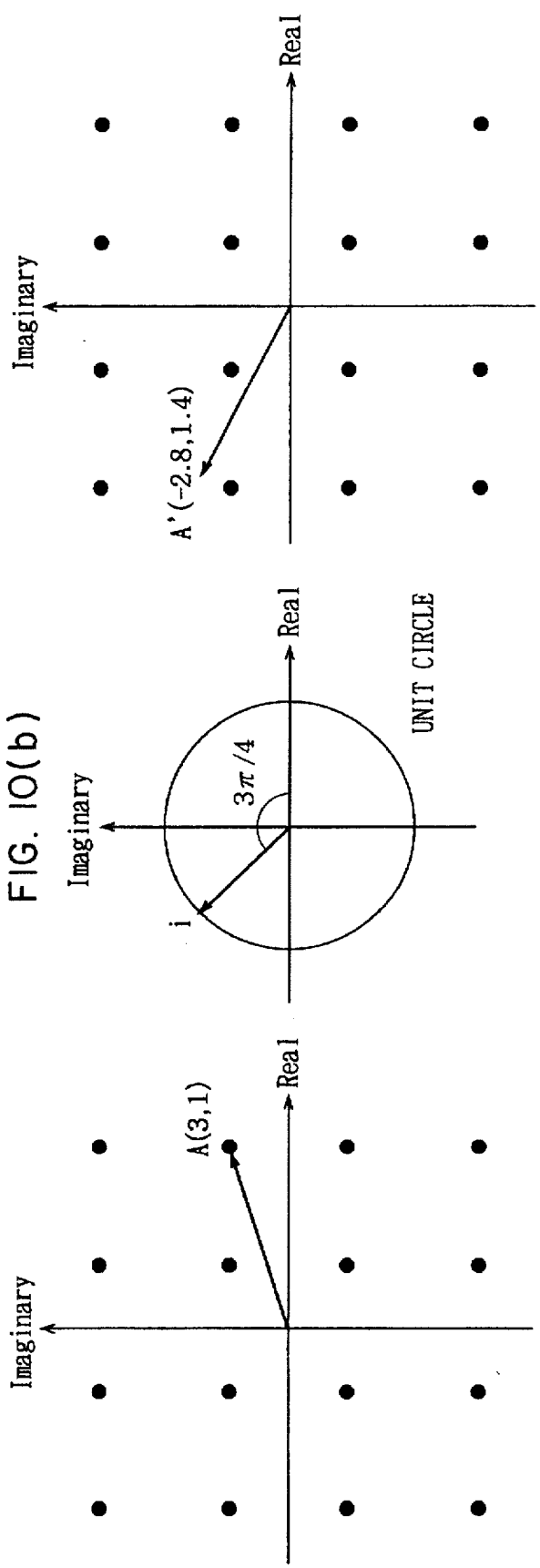
FIG. 10 illustrates the situation of a complex multiplication of a carrier modulation signal group by a complex signal group in a complex multiplier 13 shown in FIG. 9.

FIG. 10 illustrates a complex multiplication operation in the complex multiplier 13. In particular, (a) in FIG. 10 shows arrangement of signal points which can be taken by the carrier modulation signals when 16 QAM is employed as a modulation system, (b) shows a unit vector i whose phase varies at random, and (c) shows a carrier modulation signal whose phase is randomized to a specific pattern.

Referring to (a) in FIG. 10, it is assumed that a carrier modulation signal included in a carrier modulation signal group which is allotted to one carrier is arranged at a signal point A on a complex plane. The signal A has a real number part of 3 and an imaginary number part of 1. It is also assumed that the unit vector i has a phase angle of 3π/4 at this time. A carrier modulation signal A' shown at (c) in FIG. 10 is obtained as the result of a complex multiplication. The carrier modulation signal A' has a real number part of −2.8 and an imaginary number part of 1.4, and takes a signal point which is not present in the arrangement of the 16 QAM. Thus, the phase of the unit vector i varies at random, and hence the complex multiplier 13 outputs a carrier modulation signal group having signals whose phases are mutually randomized to an inverse Fourier transformer 15 even if respective carrier modulation signals included in a carrier modulation signal group which is outputted from a carrier modulation signal generator 12 are in phase with each other.

Figure 11:
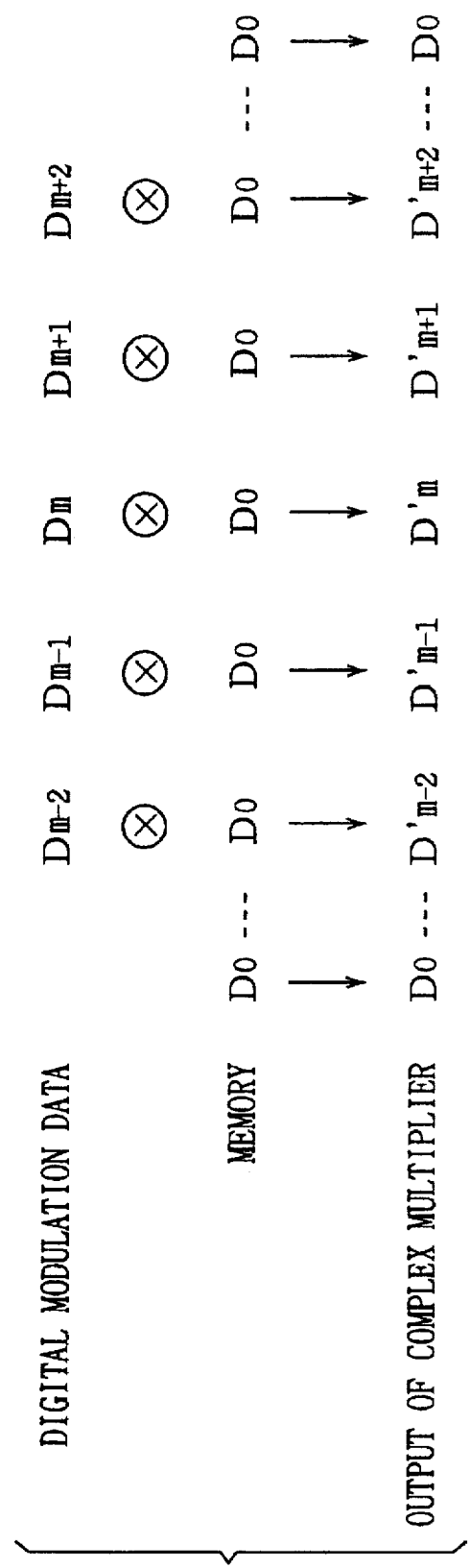
FIG. 11 illustrates operations of a memory 14 and the complex multiplier 13 shown in FIG. 9.
Figure 12:
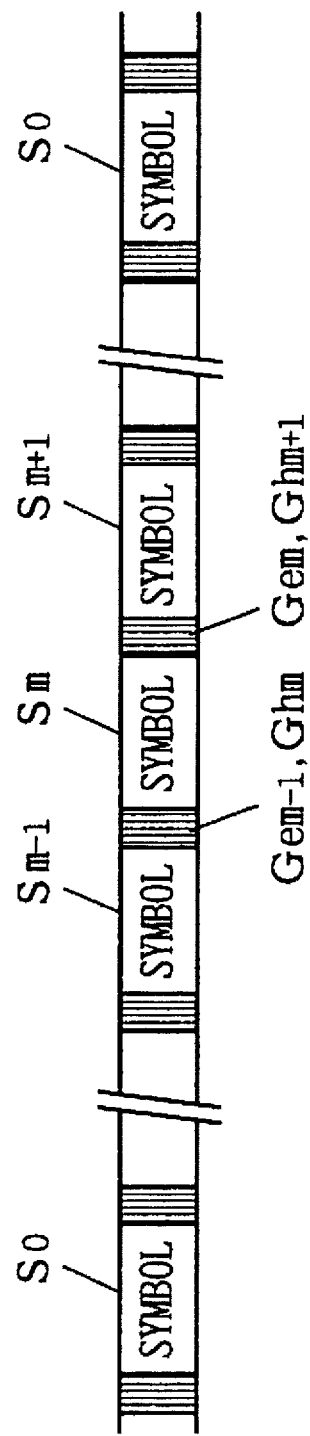
FIG. 12 is a signal structural diagram showing the structure of an OFDM signal which is transmitted from the transmitter shown in FIG. 9.

The complex multiplier 13 repeats such an operation for a prescribed period. Further, the complex multiplier 13 periodically outputs only the data D0. FIG. 11 shows a series of such operations. Assuming that S0 represents a symbol in which the data D0 is inserted, the transmitter 3 periodically outputs the data D0 of the symbol S0 while outputting data Dm of a symbol Sm in other case, as shown in FIG. 12. The inverse Fourier transformer 15 allots the carrier modulation signal group D'm to respective carriers which are lined up on the frequency axis in every symbol, and collectively performs inverse Fourier transformation and parallel-to-serial conversion thereon, thereby converting the same to a digital OFDM signal. Consequently, absolute reference phases of the carrier modulation signal group are at random values in the range of zero to $2\pi$ whereby the OFDM signal outputted from the inverse Fourier transformer 15 can be suppressed from power concentration. Thus, it is not necessary to increase the dynamic ranges of the transmitter 3 and a receiver but influences exerted on the OFDM signal by nonlinearity of the transmitter, the receiver, a relay amplifier etc. can be reduced through a low-priced structure. The remaining circuit blocks in the transmitter 3, i.e., those from a guard interval insertion part 16 to a low-pass filter 19, operate similarly to those in the transmitter 1.

The guard interval insertion part 16 inserts a data component D0 which is identical to that of a rear end part of the symbol S0 in a corresponding front guard interval, while inserting a data component which is identical to that of a front end part of the symbol S0 in a corresponding rear guard interval, similarly to the case of the symbol Sm.

When the transmitter 3 shown in FIG. 9 is employed, a receiver of the same structure as the receiver 2 shown in FIG. 2 can basically be employed. In this case, however, a memory 26 of the receiver stores receiving data ZD0 of a reference complex signal group D0 which is stored in the memory 14 of the transmitter 3.

Also in the embodiment shown in FIG. 9, an effect similar to that of the aforementioned first embodiment can be attained. Namely, amplitude/phase distortion of a receiving carrier modulation signal group appearing on the frequency axis after Fourier transformation is entirely uniform even if reflected waves are superposed on direct waves by a multipath and symbol intervals of the direct waves are superposed with guard intervals of the reflected waves, and can be removed by simple operations (multiplication and division). Further, demodulated data can be obtained with no influence by a time delay even if such a time delay is caused in the OFDM signal between the transmission and receiving sides, whereby a time window can be readily adjusted on the time axis.

While the data are transmitted through wire transmission paths in the aforementioned embodiments, the present invention is not restricted to this but data may alternatively be transmitted through a wireless transmission path. While television picture data for multichannels are carried on the respective carriers in the aforementioned embodiments, picture data for one channel may alternatively be time-shared and sequenced in a parallel manner, to be allotted to respective carriers. Further, voice data, text data or the like may be carried on the respective carriers, in place of the picture data. In addition, the present invention may alternatively be carried out in another system such as LAN or WAN, in place of the CATV.

While the reference complex signal group outputted from the memory 14 is periodically inputted in the inverse Fourier transformer 15 through the complex multiplier 13 in the transmitter 3 shown in FIG. 9, the reference complex signal group may alternatively be directly inputted in the inverse Fourier transformer 15.

While the transmitter 3 shown in FIG. 9 employs the complex signal group D0 including signals having a predetermined specific pattern and phases which mutually vary at random as the reference complex signal group to be included in the carrier modulation signal group, further, the reference complex signal group to be included in the carrier modulation signal group may alternatively be formed by a complex signal group including signals having a predetermined specific pattern which are in phase with each other under a situation causing no power concentration in the OFDM signal. Also in this case, amplitude/phase distortion can be removed by simple operations (multiplication and division), similarly to the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of transmitting an orthogonal frequency division multiplex signal from a transmission side to a receiving side in every symbol of a prescribed length through a wire or wireless transmission path, said method comprising:

a first step of transforming a carrier modulation signal group deciding the phases and amplitudes of a plurality of carriers being orthogonal to each other on the frequency axis to said orthogonal frequency division multiplex signal on the time axis by performing inverse Fourier transformation in every symbol; and a second step of adding front and rear guard intervals, including data being identical to those of rear and front end parts of each symbol of said orthogonal frequency division multiplex signal, to front and rear parts of said symbol respectively and transmitting the same to said receiving side.

2. The method of transmitting an orthogonal frequency division multiplex signal in accordance with claim 1, further comprising a third step of complex-multiplying said carrier modulation signal group by a reference complex signal group on the frequency axis, said first step being adapted to transform a complex multiplication result being obtained in said third step to said orthogonal frequency division multiplex signal.

3. The method of transmitting an orthogonal frequency division multiplex signal in accordance with claim 2, wherein said third step is adapted to complex-multiply each said carrier modulation group by a result of complex multiplication, being carried out in advance of a constant symbol, serving as said reference complex signal group with respect to each said symbol of said carrier modulation signal group.

4. The method of transmitting an orthogonal frequency division multiplex signal in accordance with claim 2, further comprising a fourth step of generating a complex signal group having a predetermined specific pattern with signals varying in phase at random, said third step employs said complex signal group being obtained in said fourth step as said reference complex signal group with respect to each said symbol of said carrier modulation signal group, and said first step ordinarily transforms said complex multiplication result being obtained in said third step to said orthogonal frequency division multiplex signal, while periodically transforming said reference complex signal group to said orthogonal frequency division multiplex signal.

5. The method of transmitting an orthogonal frequency division multiplex signal in accordance with claim 2, further comprising:

a fifth step of transforming said orthogonal frequency division multiplex signal being transmitted from said transmission side to a receiving carrier modulation signal group corresponding to said carrier modulation signal group in every symbol of said prescribed length, and a sixth step of complex-dividing said receiving signal group being obtained in said fifth step by a prescribed reference complex signal group on the frequency axis.

6. A transmitter for an orthogonal frequency division multiplex signal, being an apparatus for transmitting said orthogonal frequency division multiplex signal to a receiving side in every symbol of a prescribed length through a wire or wireless transmission path, said transmitter comprising:

memory means storing a reference complex signal group;

complex multiplication means complex-multiplying a carrier modulation signal group deciding the phases and amplitudes of a plurality of carriers being orthogonal to each other on the frequency axis by said reference complex signal group being stored in said memory means on the frequency axis, for outputting a transmission carrier modulation signal group;

inverse Fourier transformation means performing an inverse Fourier operation on said transmission carrier modulation signal group being outputted from said complex multiplication means in every symbol thereby transforming said transmission carrier modulation signal group to said orthogonal frequency division multiplex signal on the time axis;

guard interval addition means adding front and rear guard intervals, including data being identical to those of rear and front end parts of each symbol of said orthogonal frequency division multiplex signal outputted from said inverse Fourier transformation means, to front and rear parts of said symbol respectively; and transmission means transmitting said orthogonal frequency division multiplex signal having added said front and rear guard intervals to said receiving side in every symbol.

7. The transmitter for an orthogonal frequency division multiplex signal in accordance with claim 6, wherein said memory means stores a complex multiplication result of said complex multiplication means in advance of a constant symbol as said reference complex signal group.

8. The transmitter for an orthogonal frequency division multiplex signal in accordance with claim 6, wherein said memory means stores a predetermined complex signal group as said reference complex signal group, said complex multiplication means complex-multiplies said carrier modulation signal group by said reference complex signal group being stored in said memory means on the frequency axis for outputting the same, and said inverse Fourier transformation means ordinarily transforms a complex multiplication result being outputted from said complex multiplication means to said orthogonal frequency division multiplex signal in every symbol, while periodically transforming said reference complex signal group being outputted from said memory means to said orthogonal frequency division multiplex signal.

9. The transmitter for an orthogonal frequency division multiplex signal in accordance with claim 8, wherein said memory means holds an output of pseudo-noise signal generation means generating a pseudo-noise signal as said reference complex signal group.

10. The transmitter for an orthogonal frequency division multiplex signal in accordance with claim 8, wherein said memory means holds an output of frequency sweep signal generation means generating a frequency sweep signal as said reference complex signal group.

11. A receiver for an orthogonal frequency division multiplex signal, being an apparatus for receiving said orthogonal frequency division multiplex signal being transmitted from a transmission side in every symbol of a prescribed length through a wire or wireless transmission path, said receiver comprising:

Fourier transformation means performing a Fourier transformation operation on said orthogonal frequency division multiplex signal on the time axis in every symbol, thereby transforming said orthogonal frequency division multiplex signal to a receiving carrier modulation signal group on the frequency axis;

memory means storing said receiving carrier modulation signal group being outputted from said Fourier transformation means every constant symbol as a receiving reference complex signal group; and complex division means complex-dividing said receiving carrier modulation signal group being outputted from said Fourier transformation means by said receiving reference complex signal group being stored in said memory means on the frequency axis.

12. A method of transmitting an orthogonal frequency division multiplex signal from a transmission side to a receiving side in every symbol of a prescribed length through a wire or wireless transmission path, said method comprising:

a first step of forming a carrier modulation signal group for deciding the phases and amplitudes of a plurality of carriers being orthogonal to each other in every symbol on the frequency axis;

a second step of generating a complex signal group having a predetermined specific pattern with signals varying in phase at random;

a third step of complex-multiplying said carrier modulation signal group by said complex signal group in every symbol on the frequency axis, thereby randomizing the phases of respective signals of said carrier modulation signal group; and a fourth step of ordinarily transforming said carrier modulation signal group having said signals being randomized in phase in said third step to said orthogonal frequency division multiplex signal on the time axis by performing inverse Fourier transformation in every symbol while periodically transforming said complex signal group to said orthogonal frequency division multiplex signal by inverse Fourier transformation, for transmitting the same to said receiving side respectively.

* * * * *